Jan. 6, 1959 C. W. HARRIS ET AL 2,867,242
HIGH PRESSURE FLEXIBLE HOSE
Filed Jan. 16, 1956

INVENTOR.
CLARE W. HARRIS
LAWRENCE M. NELSON
BY

William R. Lane

ATTORNEY

United States Patent Office 2,867,242
Patented Jan. 6, 1959

2,867,242

HIGH PRESSURE FLEXIBLE HOSE

Clare W. Harris, Long Beach, Calif., and Lawrence M. Nelson, East Detroit, Mich., assignors to North American Aviation, Inc.

Application January 16, 1956, Serial No. 559,454

7 Claims. (Cl. 138—56)

The object of this invention is directed to a new high pressure flexible hose. More particularly, this invention concerns a flexible device for restraining the axial forces created in a high pressure fluid carrier.

Heretofore fluid conduits have been made by building up various layers of metal (or other material) coverings over a flexible fluid-carrying tube. Metal wires or strips have been wound or braided around the inner cores and individually attached to end portions of the hose. The basic weakness in each of these prior hose structures is the point of attachment of the individual strips (helical, for example) or wire braid to the hose ends. In addition, it has been extremely difficult to obtain uniform length for the individual wires or strip elements. In order to compensate for the structural weakness inherent in attaching the individual elements the prior designs have utilized about three times the theoretical number of wire or strip elements. This tends to increase the over-all weight and reduce the flexibility of the assembly.

The present invention basically comprises the use of a helically slotted integral sleeve adapted to be formed around an inner fluid carrier. The cylindrical sleeve of this invention has integral band elements on the ends thereof sufficient to compensate for weld factors. Since each of the slots are of the same length it follows that the helical strips separating the slots are each of the same length.

An object of this invention is to provide a new and improved flexible hose construction.

A further object of this invention is to provide a flexible conduit for restraining the axial forces created in a high pressure hose.

A still further object of this invention is to provide a conduit covering for a flexible fluid-carrying tube.

An additional object of this invention is to provide an improved conduit covering for reinforcing a fluid-carrying tube against axial and twisting forces.

A further object of this invention is to provide a new and improved helical covering for a fluid-carrying tube.

A still further object of this invention is to provide a new and improved helical conduit covering.

Figure 1:
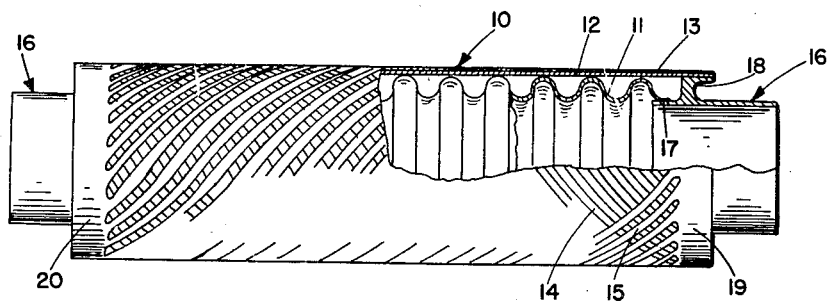
Figure 2:
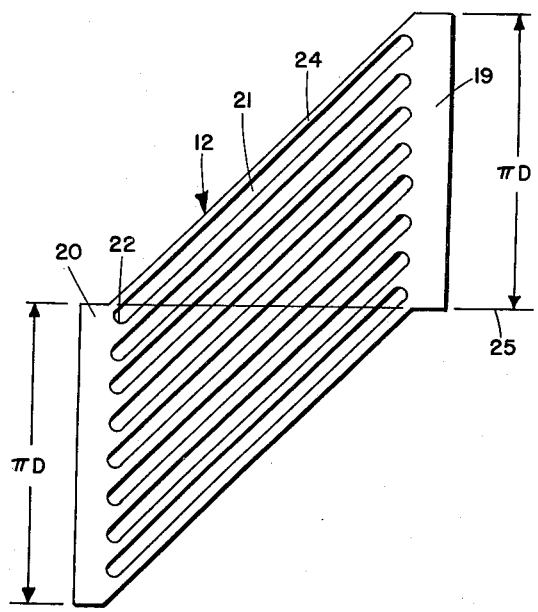

The above objects, as well as other objects of this invention, will be apparent from the accompanying drawing and description in which:

Fig. 1 is a partial cutaway and cross section of the hose and conduit covering of this invention; and Fig. 2 is a plan view of a sleeve element prior to forming into a predetermined shape.

The hose, illustrated in Fig. 1, comprises an inner flexible fluid carrier 11, attached at the ends thereof, to flanges 17 of spaced ferrule or attaching portions 16. The particular configuration of the inner fluid carrier 11 forms no part of the present invention. The fluid carrier 11 may be of the bellows type as illustrated or may be in the form of an integral hose or tubing made of any of a variety of metals, plastics or rubbers.

The carrier 11 may be welded, brazed, adhesively bonded or mechanically clamped to any surface of the end portions 16. It can also be seen that the end portion 16 may typically take the form of a flanged opening within a structure to which the hose is to be attached. A first helically slotted sleeve 12 is formed around the inner fluid carrier 11. The sleeve 12 is shown in detail in Fig. 2 prior to its being formed around the inner fluid carrier 11. The sleeve 12 comprises a sheet of approximately rhombic shape having band elements 19 and 20 at the ends thereof, offset on either side of a reference line 25, and parallel slots 21 extending from such band elements. The slots 21 may be machined, chemically etched or stamped out of the surface of the sleeve sheet 12 and are constructed with a rounded end configuration 22. The band elements of these sleeves have an effective length equal to $\pi D$ where D is the resultant sleeve diameter. When a sleeve 12 is formed around the inner fluid carrier 11, the remaining elements 24 in such sleeve take the form of helical elements 14 integral with the band elements 19 and 20. The band portions 19 and 20 may be welded, brazed, adhesively bonded or mechanically attached typically to a portion 18 of the ferrule portion 16. A construction is thus obtained having optimum strength at the zone of attachment and containing perfectly spaced helical elements of constant length.

In order to provide torsional stability to the hose when it is adapted to be twisted in any direction, a second sleeve 13 is also placed around the sleeve 12. The sleeve 13 is of similar construction to sleeve 12 except for the fact that the helical angle of the resultant helical elements 15 is reversed from that of the first sleeve. It is to be realized that the choice of one, two or multiple numbers of sleeves is dependent upon the particular use to which the conduit covering is subjected. The particular size of the slots and helical elements, as well as the dimensions of the band elements 19 and 20, are also dependent upon the particular application of the hose.

Various materials may be used in constructing the sleeves 12 and 13 and the inner carrier 11. For maximum strength, stainless steel is generally used, but brass, aluminum, heat treated 4130 carbon steel or plastics may, for example, be employed.

The present invention provides a flexible hose for restraining axial forces in which the helical strips are equally loaded since they are all fabricated to the same length and in which the efficiency of attachment between the sleeve and the end fitting is at a maximum due to the sleeve flange or band containing proportionately more material than the slotted cross-sectional portion of the sleeve.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A flexible hose comprising an inner fluid carrier, a first helically slotted sleeve around and connected to said carrier and a second helically slotted sleeve around and connected to said first sleeve, the helical angle of the slots formed in said second sleeve being reversed from that of the slots formed in said first sleeve.

2. A high pressure conduit covering comprising an end fitting, a first helically slotted sleeve attached to and extending from said end fitting, a second helically slotted sleeve peripherally around said first sleeve, the helical angle of the slots of said second sleeve being reversed from that of the slots in said first sleeve, the ends of said sleeves opposite the ends attached to said fitting being adapted to be attached to an adjoining structure.

3. A high pressure conduit covering comprising a cylindrical end fitting, a first helically slotted elongated cylindrical sleeve attached to and extending from said end fitting, a second helically slotted elongated cylindrical sleeve around said first sleeve, the helical angle of the slots of said second sleeve being reversed from that of the slots in said first sleeve, the end of each slot having a rounded configuration, the ends of said sleeves opposite the ends attached to said fitting being adapted to be attached to an adjoining structure.

4. A high pressure conduit comprising two spaced cylindrical ferrule portions, an inner fluid carrier connected between said portions, a first metal sleeve surrounding said carrier, a second metal sleeve surrounding said first sleeve and substantially coextensive therewith, integral band elements at the ends of said sleeves attached to said portions, and helical elements on said sleeves integral with said band elements and extending between said band elements at opposite helical angles on said respective first and second sleeves.

5. A high pressure conduit comprising two spaced cylindrical attaching portions, an inner fluid carrier connected between said portions, a first metal sleeve surrounding said carrier, a second metal sleeve surrounding said first sleeve, band elements at the ends of said sleeves attached to said portions, and helical elements integral with said band elements and extending between said portions, the helical angle of said helical elements on said first sleeve being opposite from the helical angle of said helical elements on said second sleeve.

6. A high pressure conduit covering comprising a sleeve having a first end band of an effective circumference equal to $\pi D$ where D is the desired sleeve diameter, a second end band of an effective circumference equal to that of said first end band, and integral parallel helical elements extending from said first end band to said second end band.

7. The invention as set out in claim 6 in which a second similar substantially coextensive sleeve is provided over said first sleeve and having the helical angle of the helical elements reversed from that of said first sleeve helical elements.

References Cited in the file of this patent

UNITED STATES PATENTS 1,993,984   Wulle et al. _____ Mar. 12, 1935

FOREIGN PATENTS 262,058   Switzerland _____ Sept. 16, 1949